United States Patent
Wu et al.

(10) Patent No.: US 7,630,892 B2
(45) Date of Patent: Dec. 8, 2009

(54) METHOD AND APPARATUS FOR TRANSDUCER-BASED TEXT NORMALIZATION AND INVERSE TEXT NORMALIZATION

(75) Inventors: Qiang Wu, Bellevue, WA (US); Rachel I. Morton, Seattle, WA (US); Li Jiang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/939,005

(22) Filed: Sep. 10, 2004

(65) Prior Publication Data

US 2006/0069545 A1 Mar. 30, 2006

(51) Int. Cl.
G10L 21/00 (2006.01)
G06F 5/01 (2006.01)

(52) U.S. Cl. .................. 704/234; 704/224; 704/231; 704/251; 704/257; 704/9

(58) Field of Classification Search ................ 704/251, 704/257, 231, 224, 234, 8–10
See application file for complete search history.

(56) References Cited

U.S. PATENT DOCUMENTS

| | | | | |
|---|---|---|---|---|
| 5,761,640 A | * | 6/1998 | Kalyanswamy et al. | 704/260 |
| 5,970,449 A | * | 10/1999 | Alleva et al. | 704/235 |
| 6,449,589 B1 | * | 9/2002 | Moore | 704/9 |
| 6,490,549 B1 | * | 12/2002 | Ulicny et al. | 704/10 |
| 6,493,662 B1 | * | 12/2002 | Gillam | 704/9 |
| 6,513,002 B1 | * | 1/2003 | Gillam | 704/9 |
| 7,028,038 B1 | * | 4/2006 | Pakhomov | 707/100 |
| 2002/0052742 A1 | * | 5/2002 | Thrasher et al. | 704/251 |
| 2002/0069065 A1 | * | 6/2002 | Schmid et al. | 704/270 |
| 2002/0116169 A1 | * | 8/2002 | Ait-Mokhtar et al. | 704/234 |
| 2002/0123881 A1 | * | 9/2002 | Schmid et al. | 704/4 |
| 2003/0101054 A1 | * | 5/2003 | Davis et al. | 704/235 |
| 2004/0107099 A1 | * | 6/2004 | Charlet | 704/234 |
| 2005/0149319 A1 | * | 7/2005 | Honda et al. | 704/9 |
| 2005/0216256 A1 | * | 9/2005 | Lueck | 704/10 |
| 2006/0041427 A1 | * | 2/2006 | Yegnanarayanan et al. | 704/235 |

* cited by examiner

*Primary Examiner*—David R Hudspeth
*Assistant Examiner*—Abdelali Serrou
(74) *Attorney, Agent, or Firm*—Theodore M. Magee; Westman, Champlin & Kelly, P.A.

(57) ABSTRACT

A method and apparatus are provided that perform text normalization and inverse text normalization using a single grammar. During text normalization, a finite state transducer identifies a second string of symbols from a first string of symbols it receives. During inverse text normalization, the context free transducer identifies the first string of symbols after receiving the second string of symbols.

15 Claims, 11 Drawing Sheets

```
                                                300
                                                 /
                                   302      304  314    316   318    312
<rule name="cardinal-digit">
        <one-of>
308             <translate> <in> 1 </in> <out cost="1"> one </out> </translate>
                <translate> <in> 2 </in> <out cost="1"> two </out> </translate>
                <translate> <in> 3 </in> <out cost="1"> three </out> </translate>
                <translate> <in> 4 </in> <out cost="1"> four </out> </translate>
                <translate> <in> 5 </in> <out cost="1"> five </out> </translate>
                <translate> <in> 6 </in> <out cost="1"> six </out> </translate>
                <translate> <in> 7 </in> <out cost="1"> seven </out> </translate>
                <translate> <in> 8 </in> <out cost="1"> eight </out> </translate>
310             <translate> <in> 9 </in> <out cost="1"> nine </out> </translate>
        </one-of>
</rule>       306

<rule name="cardinal-tens">        324
        <one-of>
                <translate> <in> 2 </in> <out> twenty </out> </translate>
                <translate> <in> 3 </in> <out> thirty </out> </translate>
                <translate> <in> 4 </in> <out> forty </out> </translate>
                <translate> <in> 5 </in> <out> fifty </out> </translate>
                <translate> <in> 6 </in> <out> sixty </out> </translate>
                <translate> <in> 7 </in> <out> seventy </out> </translate>
                <translate> <in> 8 </in> <out> eighty </out> </translate>
                <translate> <in> 9 </in> <out> ninety </out> </translate>
        </one-of>
</rule>        325

<rule name="cardinal-two-digit-number-over-20">
        <ruleref name="cardinal-tens"/>       322
        <one-of>
                <translate> <in> 0 </in> </translate>
                <ruleref name="cardinal-digit"/>
        </one-of>
</rule>
```

FIG. 3

```
800        <rule name="Number">        802
              <one-of>
                <translate>
                   <out> one <tag $.Val=1/> </out> <in> 1 <tag $.Val=1/> </in>
                   <out> two <tag $.Val=2/> </out> <in> 2 <tag $.Val=2/> </in>
                   <out> three <tag $.Val=3/> </out> <in> 3 <tag $.Val=3/> </in>
                   <out> four <tag $.Val=4/> </out> <in> 4 <tag $.Val=4/> </in>
                   <out> five <tag $.Val=5/> </out> <in> 5 <tag $.Val=5/> </in>
                   <out> six <tag $.Val=6/> </out> <in> 6 <tag $.Val=6/> </in>
                   <out> seven<tag $.Val=7/> </out> <in> 7 <tag $.Val=7/> </in>
                   <out> eight <tag $.Val=8/> </out> <in> 8 <tag $.Val=8/> </in>
                   <out> nine <tag $.Val=9/> </out> <in> 9 <tag $.Val=9/> </in>
                   <out> ten <tag $.Val=10/> </out> <in> 10 <tag $.Val=10/> </in>
                   <out> eleven <tag $.Val=11/> </out> <in> 11 <tag $.Val=11/> </in>
                   <out> twelve <tag $.Val=12/> </out> <in> 12 <tag $.Val=12/> </in>
                              •
                              •
                              •
                   <out> fifty-nine <tag $.Val=59/> </out> <in> 59 <tag $.Val=59/> </in>
                </translate>
              </one-of>
            </rule>
                                                    804
805      <rule name="Minute">
            <ruleref name="Number"/>              806
            <translate>
               <out> <tag> $.Val = $Number.Val </tag> </out>
               <in> <tag> $.Val = $Number.Val </tag> </in>
807         </translate>
            </rule>
                                        810        808
          <rule name="Hour">
             <ruleref name="Number"/>
             <translate>
               <out> <tag> $.Val = $Number.Val </tag> </out>
               <in>  <tag> $.Val = $Number.Val </tag> </in>
             </translate>
          </rule>

<rule name="Time">          812
             <ruleref name="Minute"/>
             <translate> <out cost="infinite"> to </out> </translate>
             <ruleref name="Hour"/>
814          <translate>
                <out cost="infinite">
816             <tag>
                   function TimeFormat(MinVal, HourVal) {... return ("10:50");}
                   $.Network[0].OutStr = TimeFormat($Minite.Val, $Hour.Val);
818             </tag>
                </out>
815          </translate>
          </rule>
```

FIG. 8

900 ⟿ $Number[1].Val= "10"

$Minute.Val = $Number[1].Val

902 ⟿ $Number[2].Val= "11"

$Hour.Val = $Number[2].Val function TimeFormat(MinVal, HourVal) {... return ("10:50");}

$.Network[0].OutStr = TimeFormat($Minute.Val, $Hour.Val)

FIG. 9                904

```
                                        ┌─ 1000
    <rule name="MetricPrefixExpanded">
        <one-of>
1010 ─   <transduce> <in> Tera </in> <in>T</in><out> Tera </out> </transduce>
         <transduce> <in> Giga </in> <out> Giga </out> </transduce>
         <transduce> <in> Mega </in> <out> Mega </out> </transduce>
1012 ─   <transduce> <in> Kilo </in> <in>K</in><out> Kilo </out> </transduce>
         <transduce> <in> Hekto </in> <out> Hekto </out> </transduce>
         <transduce> <in> Deka </in> <out> Deka </out> </transduce>
         <transduce> <in> Dezi </in> <out> Dezi </out> </transduce>
         <transduce> <in> Zenti </in> <out> Zenti </out> </transduce>
         <transduce> <in> Milli </in> <out> Milli </out> </transduce>
         <transduce> <in> Mikro </in> <out> Mikro </out> </transduce>
         <transduce> <in> Nano </in> <out> Nano </out> </transduce>
         <transduce> <in> Piko </in> <out> Piko </out> </transduce>
         <transduce> <in> Femto </in> <out> Femto </out> </transduce>
         <transduce> <in> Atto </in> <out> Atto </out> </transduce>
        </one-of>
    </rule>
                                    ┌─ 1002
    <rule name="MeterExpanded">
        <one-of>
            <item>
                <ruleref name="MetricPrefixExpanded"/>
                <one-of>
1004 ─          <transduce>
                    <in> meter </in> <out action="glue-L"> meter </out>
                </transduce>
1006 ─          <transduce>
                    <in> meters </in> <out action="glue-L"> meters </out>
                </transduce>
1008 ─          <transduce>
                    <in> metern </in> <out action="glue-L"> metern </out>
                </transduce>
                </one-of>
            </item>
            <item>
                <transduce> <in> Meter </in> <out> Meter </out> </transduce>
            </item>
            <item>
                <transduce> <in> Meters </in> <out> Meters </out> </transduce>
            </item>
            <item>
                <transduce> <in> Metern </in> <out> Metern </out> </transduce>
            </item>
        </one-of>
    </rule>
```

FIG. 10

METHOD AND APPARATUS FOR TRANSDUCER-BASED TEXT NORMALIZATION AND INVERSE TEXT NORMALIZATION

BACKGROUND OF THE INVENTION

The present invention relates to text processing. In particular, the present invention relates to transforming between different forms of text.

In many speech recognition systems, the speech recognition is limited to word sequences defined in a context free grammar. Authoring such grammars can be complex because the author must take into consideration all the different ways that written text can be spoken. For example, the written numbers "123" can be pronounced "one two three", "one twenty-three", or "one hundred twenty-three".

In addition, speech recognizers are designed to provide spoken forms of the words as output. Before displaying these spoken words, it is common to perform an inverse text normalization to convert the spoken form of the word into a written or display form. For example, the words "one two three" would be converted into "123".

In the past, either hard-coded rules or a context free grammar has been used to perform the inverse text normalization. The hard-coded rules are time-consuming to construct and the context free grammar is very limited in that it can only be used on complete words, and it cannot handle inverse text normalizations in which the order of the symbols in the display text is different than the order in the spoken text. For example, context free grammars of the prior art cannot convert "ten to twelve" into "11:50".

The context free grammar for performing inverse text normalization under the prior art also only provides one output candidate per input spoken form. Since there is often more than one way to display a spoken word, this limited response is undesirable. In addition, the parsing system used to parse an input text using the context free grammar of the prior art is not as fast as desired.

Text normalization, in which the written form of a word or speech sound is converted into its spoken form has largely been performed by hand as part of forming the context free grammar for the speech recognition engine. As a result, text normalization and inverse text normalization have been treated as separate problems that have been addressed using separate solutions. Thus, the current state of the art has required that two separate systems be built in order to provide both text normalization and inverse text normalization.

SUMMARY OF THE INVENTION

A method and apparatus are provided that perform text normalization and inverse text normalization using a single grammar. During text normalization, a context free transducer identifies a second string of symbols from a first string of symbols it receives. During inverse text normalization, the context free transducer identifies the first string of symbols after receiving the second string of symbols.

BRIEF DESCRIPTION OF THE DRAWINGS

FIG. 3 is an example of a text normalization/inverse text normalization grammar under one embodiment of the present invention.

FIG. 8 is an example grammar of one embodiment of the present invention showing embedded scripting.

FIG. 9 is an example of a script formed from embedded scripting in a grammar.

FIG. 10 is an example grammar of one embodiment of the present invention showing grammar definitions for portions of words instead of entire words.

DETAILED DESCRIPTION OF ILLUSTRATIVE EMBODIMENTS

Figure 1:
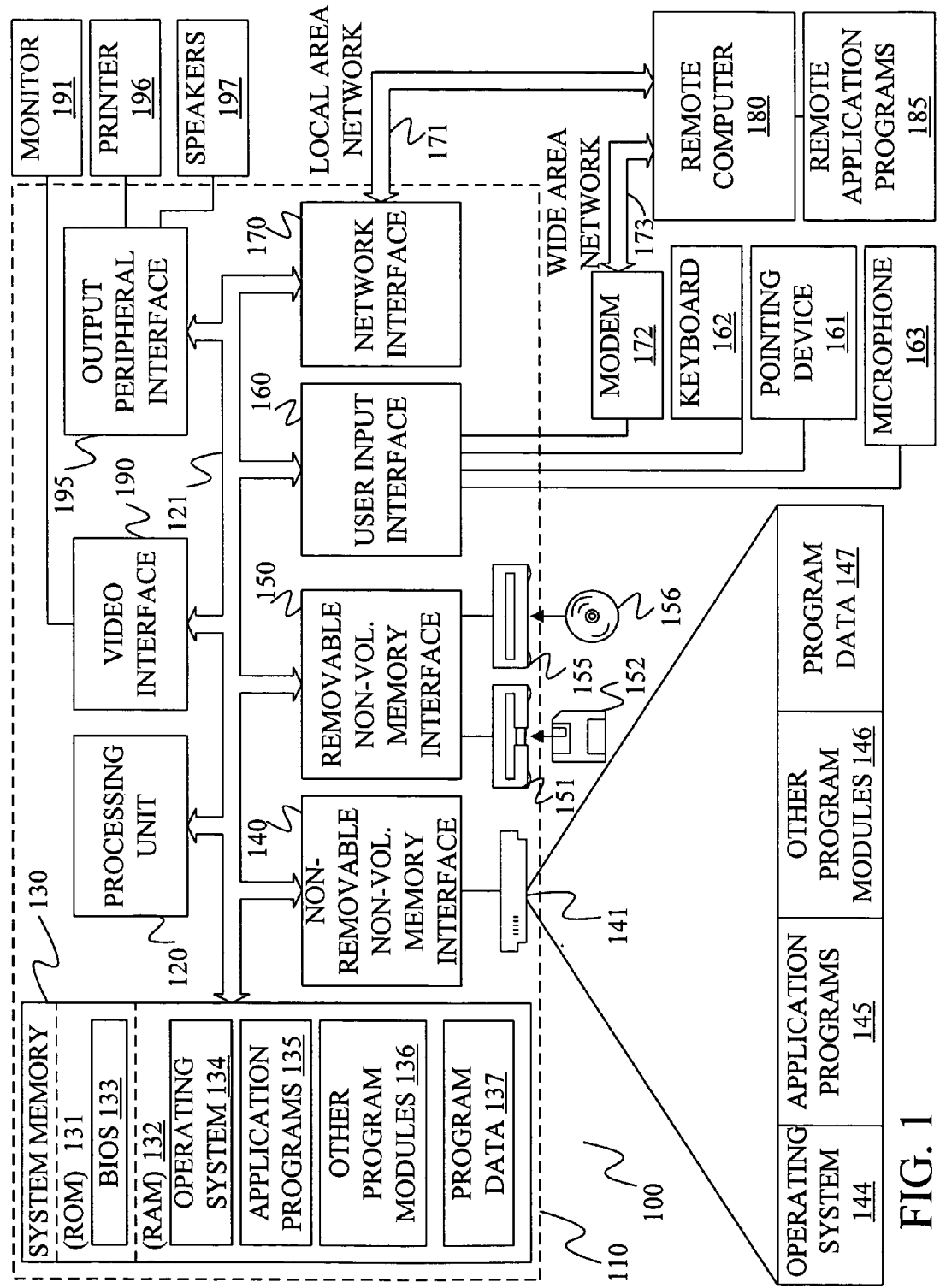
FIG. 1 is a block diagram of one computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
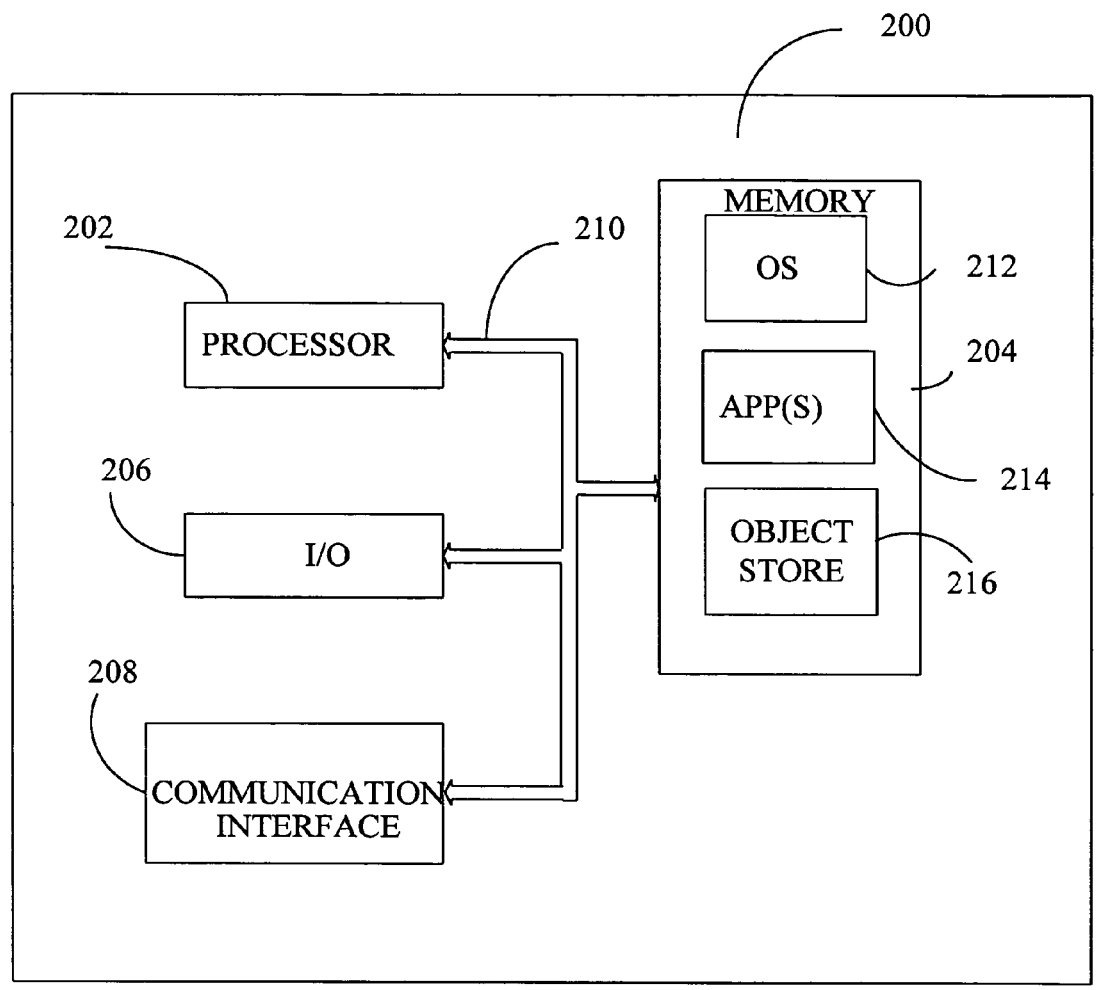
FIG. 2 is a block diagram of an alternative computing environment in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a context free transducer that allows for both text normalization and inverse text normalization using the same grammar. An example of such a grammar is shown in FIG. 3.

In FIG. 3, the grammar is written using mark-up language tags, such as tags 300, 302 and 304. In general, the tags appear in pairs with a starting tag, such as <translate> tag 302 and an ending tag such as </translate> tag 312.

A number of different tags can be used with the present invention. For example, a <rule> tag such as starting <rule> tag 300 and ending </rule> tag 306 define a set of paths that can be traversed to satisfy a rule. A path in a rule is formed by a sequence of transitions, were a transition is designated by either a pair of <translate> tags, such as <translate> tags 302 and 312, or by a <ruleref> tag, such as <ruleref> tag 322.

Each transition that is defined by a pair of <translate> tags includes a pair of <in> tags such as <in> tags 304 and 314, and a pair of <out> tags, such as <out> tags 316 and 318. Each pair of <in> tags includes a sequence of symbols representing a written or display form of a word. Each pair of <out> tags includes a sequence of symbols representing a spoken form of a word. During text normalization, a sequence of symbols in the input string must match a sequence of symbols between the <in> tags in order for the transition to be followed by the transducer. During inverse text normalization, a sequence of symbols in the input string must match a sequence of symbols between the <out> tags in order for the transition to be followed by the transducer.

Each <out> tag and each <in> tag may have an optional "cost" property that indicates the cost of matching the text between the tags. This provides a cost to each transition that can be used to form a cost for the complete path through a rule. Each <out> tag and each <in> tag may also have an optional "case='insensitive'" property, that allows a match to words between the tags regardless of the capitalization form of the words.

The <out> and <in> tags can also be provided with additional properties that describe further aspects of the text that must match the property of the tag in order to match the words within the tag. For example, the gender, number or person associated with an input text can be matched against a "gender", "number", or "person" property listed in the <out> or <in> tag. A possible output will be generated for a tag only if the text and the properties of the text match the text between the tags and the properties defined in tags. This helps to keep the transducer from over-generating possible normalizations or inverse normalizations.

Other examples of possible properties include name entity properties such as "personal names", "place names", and "company names". Using these properties, it is possible to apply the correct capitalization during inverse text normalization.

Transitions marked by a <ruleref> tag are followed if the input string can match a complete path through the rule referenced in the <ruleref> tag. For example, in order for the transition marked by <ruleref> tag 322 to be traversed, the input string must complete a path through the "cardinal-tens", which is defined between <rule> tags 324 and 325. In this context, the rule that is identified in the <ruleref> tag is the referenced rule, and the rule that contains the <ruleref> tag is the referencing rule.

To allow for multiple parallel input words to be associated with multiple parallel output words, more than one pair of <in> tags and more than one pair of <out> tags may be present between a pair of <translate> tags. When more than one pair of <in> tags or <out> tags is found between <translate> tags, the text in those tags are treated as alternative written and spoken forms, respectively.

Under the grammar of the present invention, multiple parallel transition paths may be defined between two states using a pair of <one-of> tags such as <one-of> tags 308 and 310. Each translate tag within a pair of <one-of> tags represents a separate parallel transition path. Sequences of transitions may be grouped together using a pair of <item> tags.

The tags described above are samples of possible tags under the present invention. In other implementations, other tags may be used in their place.

Because the same grammar can be used for text normalization and inverse text normalization, the present invention reduces the amount of work that must be performed to achieve both text normalization and inverse text normalization. In addition, because they are defined in the same grammar, the results produced by text normalization and inverse text normalization are more consistent with each other than in the prior art.

Figure 4:
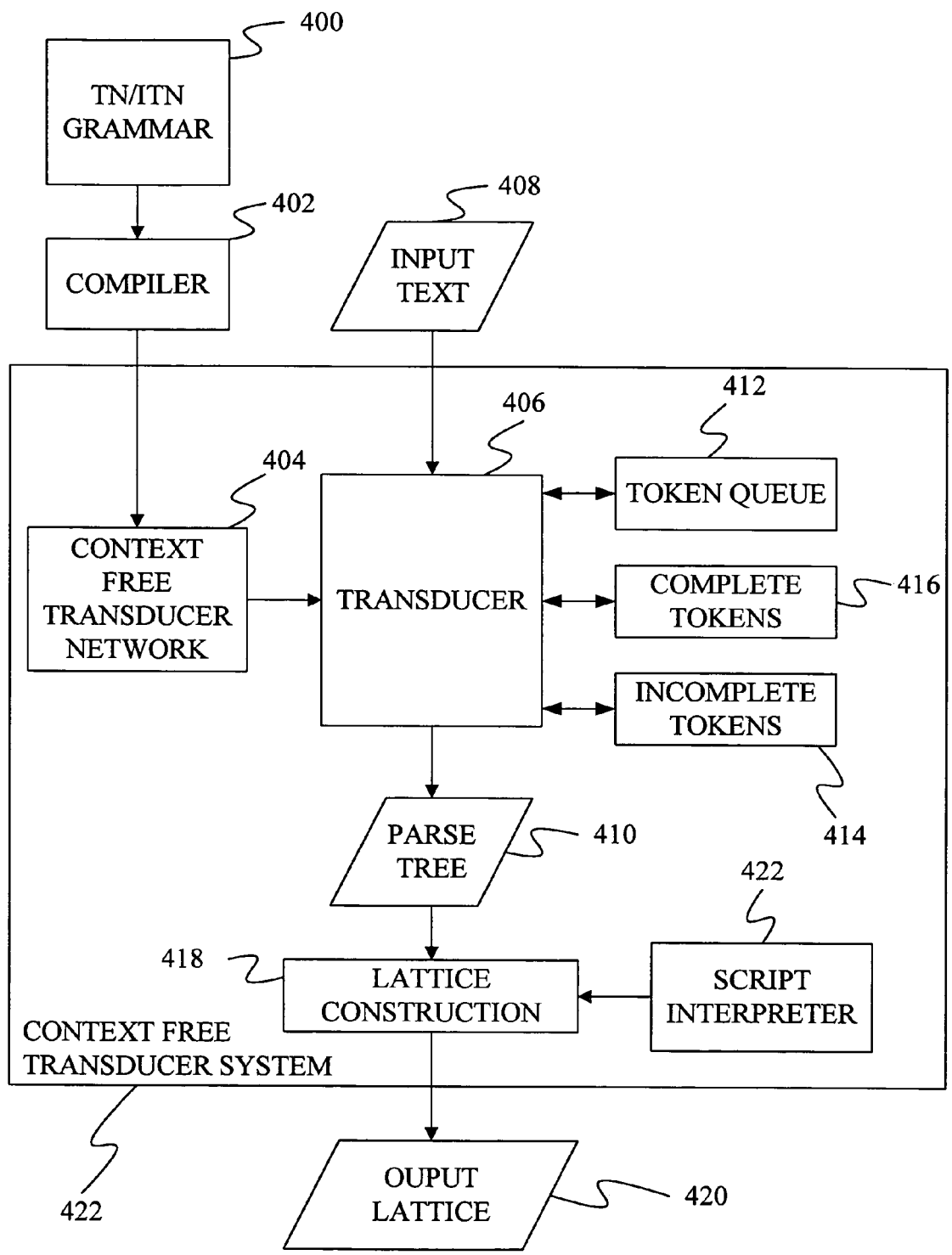
FIG. 4 is a block diagram of a context free transducer system of the present invention for performing text normalization/inverse text normalization.
Figure 5:
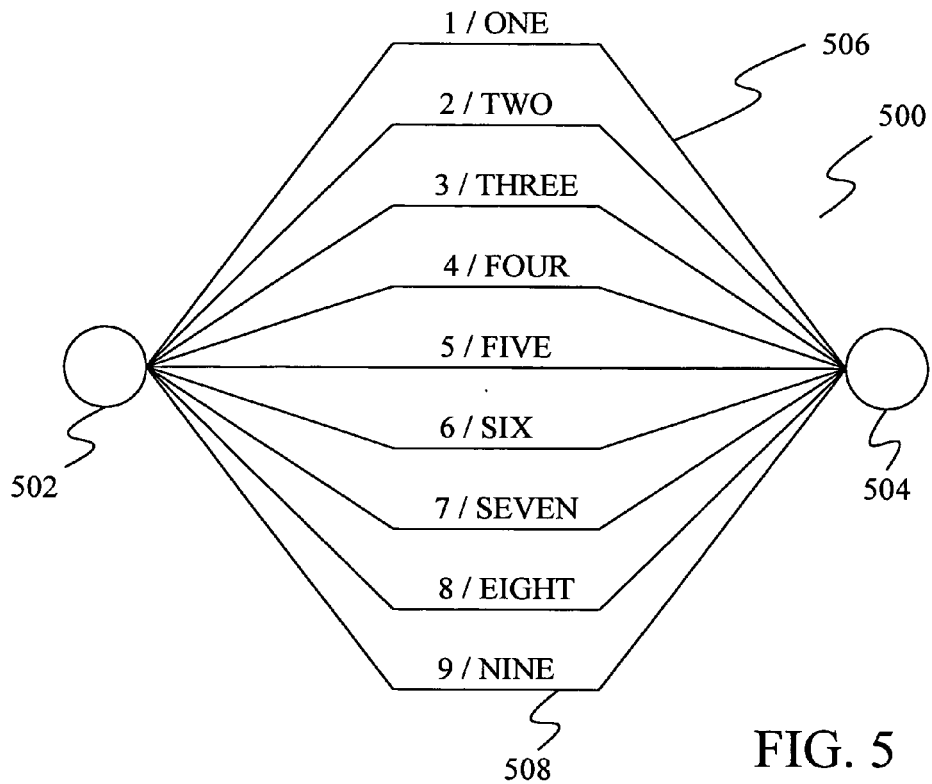
FIG. 5 is an example of a context free transducer network compiled from a grammar of the present invention.

Before the grammar can be used by a transducer of the present invention, it must be compiled into a context free transducer network. As shown in FIG. 4, the text normalization/inverse text normalization grammar 400 is complied by complier 402 into a context free transducer network 404. This forms a network of states that are connected together by transitions. For example, rule 300 of FIG. 3 would be compiled into network 500 of FIG. 5. In FIG. 5, two states 502 and 504 are connected together by a set of parallel paths including paths 506 and 508. During text normalization, the transducer may transition across one of the paths if the input string matches the text between <in> tags of the grammar. For example, for path 506, the input text would have to include the symbol "1" in order for the transducer to transition along path 506. During inverse text normalization, the transducer may transition across one of the paths if the input string matches text between <out> tags associated with the transition.

Under one embodiment of the present invention, the compilation of the grammar into the context free transducer network includes the formation of initial transition tables for each rule. Each initial transition table consists of a set of symbol sequences that represent the symbol sequences associated with the transitions from the first state in the rule. Under one embodiment, this table includes one set of entries for text normalization and one set of entries for inverse text normalization. Under other embodiments, the tables are only constructed for text normalization.

Figure 6:
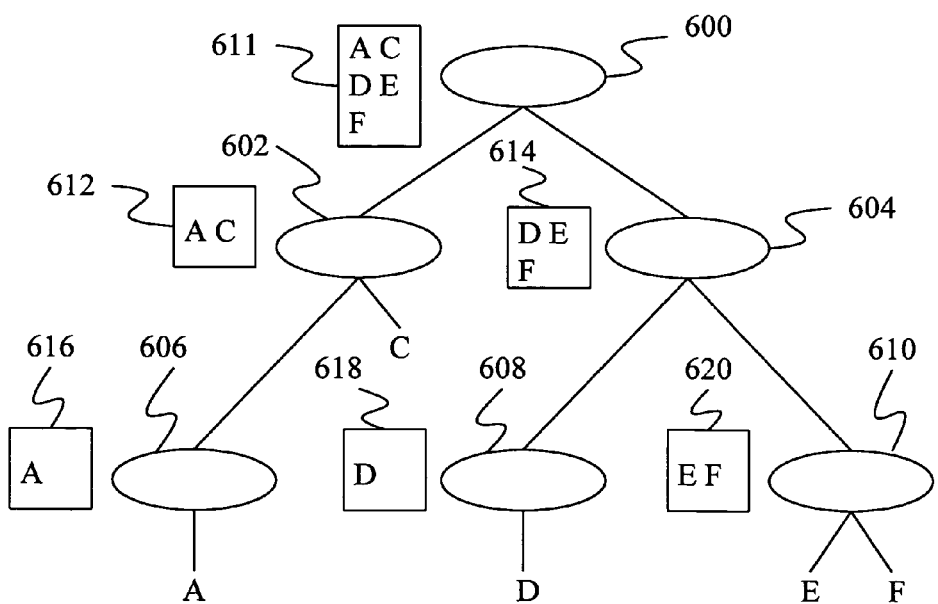
FIG. 6 is a graph showing the production of look-ahead tables under one embodiment of the present invention.

Because of the ability to have rule references within rules, nested rules that extend from the first state must be examined to develop the initial transition table for the rule. FIG. 6 provides a hierarchical depiction of a set of nested rules 600, 602, 604, 606, 608 and 610. Rule 606 consists of an initial transition that is associated with symbol sequence A, and other subsequent transitions that are not shown. Since rule 606 only has one initial transition, only symbol sequence A is stored in initial transition table 616 for rule 606. Similarly, rule 608 has only a single initial transition, and as such, initial transition table 618 for rule 608 includes only a single symbol sequence D.

Rule 610 includes two parallel initial transitions, which are associated with symbols sequences E and F, respectively. As such, initial transition table 620 for rule 610 includes both symbol sequence E and symbol sequence F.

Rule 606 is referenced by rule 602 in parallel with an initial transition associated with symbol sequence C. As such, initial transition table 612 for rule 602 includes symbol sequence C as well as the initial transition symbol sequence A of rule 606.

Rule 604 has two initial transitions, which respectively contain rule references for rules 608 and 610. As such, initial transition table 614 for rule 604 includes the symbol sequences of initial transition table 618 for rule 608 and initial transition table 620 of rule 610. Thus, initial transition table 614 includes symbol sequences D, E and F.

Rule 600 includes two initial <ruleref> transitions that are in parallel with each other and that reference rules 602 and 604, respectively. As such, initial transition table 611 for rule 600 includes the symbol sequences from initial transition table 612 and the symbol sequences from initial transition table 614. As such, initial transition table 611 includes symbol sequences A, C, D, E and F.

As will be discussed further the below, the initial transition tables associated with the rules allow rules to be removed from consideration without expanding all of the sub-rules that are nested within the rule simply. This is done by determining if the next word in the input is found in the initial transition table for the rule. If the next word in the input is not found in the initial transition table, the rule does not need to be expanded for the current word.

Once context free transducer network 404 has been compiled, it is provided to a transducer 406, which parses an input text 408 using the context free transducer network to form a parse tree 410. When the transducer network is provided to transducer 406, the transducer is instructed to perform either text normalization or inverse text normalization, since the context free transducer network can be used for both.

Figure 7:
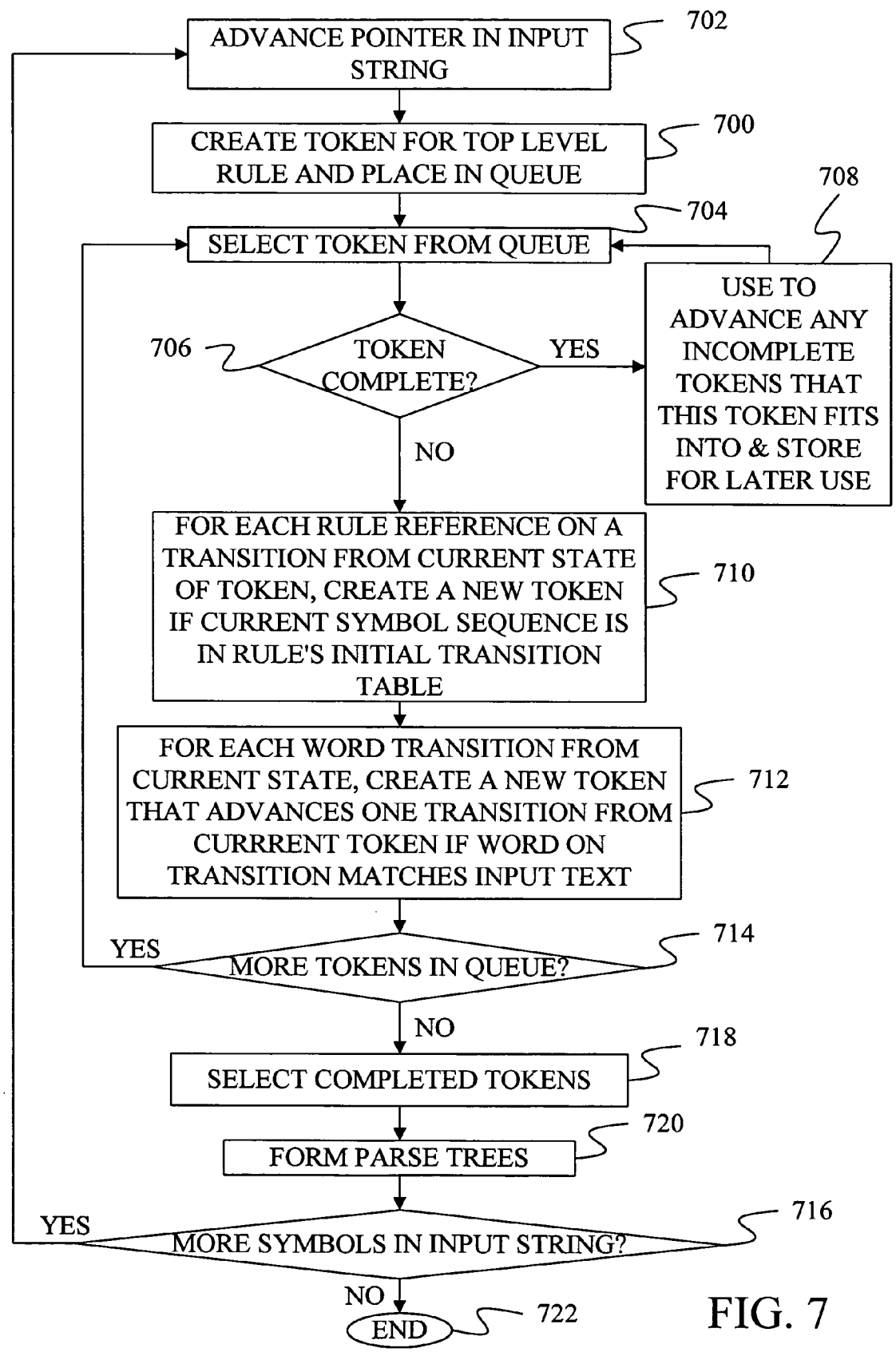
FIG. 7 is a flow diagram for forming a parse tree from an input text using a context free transducer network of the present invention.

FIG. 7 provides a flow diagram of a procedure for parsing an input text under some embodiments of the present invention. In step 700, a token for a top level rule is created and placed in a queue 412. This top level rule contains a set of parallel transitions, with one transition for each possible rule in context free transducer network 404. Under the present invention, a token is a data structure that contains the identity of the rule that the token represents, the current transducer state in the rule, the position in the input text where this rule was started, the last position in the input text where this rule was evaluated, the current cost of traversing the rule to the current state, an index to a previous token that represents the current rule explored up to the state before the current state, and an index to a complete token that was used to transition to the current state.

At step 704, a token is selected from queue 412 and is examined at step 706 to determine if it is complete. The token is complete when a path from the beginning state to the ending state of the rule associated with the token has been traversed based on the input string.

If the token is complete, the token is used to advance any incomplete tokens that this token fits into at step 708. A list of incomplete tokens is kept in an incomplete tokens list 414. Advancing an incomplete token involves advancing across the transition associated with the rule for the complete token and creating a new token based on this advance. The new token, which represents a rule complete to the state after the traversed transition is added to the queue.

The complete token that was selected at step 704 is also stored in a complete token list 416 at step 708. By storing the completed tokens, the present invention avoids re-computing rules that are already known to match a segment of the input string.

If the selected token is not complete at step 706, each rule reference at each transition from the current state of the token is examined. If there exists a token in the complete token table that fits it, a new token is generated based on this advance. If the transition is a ruleref transition but there is no corresponding complete token that fits it, a new token may be generated to explore the sub-rule further. The rule is eliminated from further investigation\search and no token is generated for this rule transition if the current symbol sequence in the input string is not in the initial transition table of the referenced rule at step 710. Thus, a new token for a rule reference transition is only created if the current symbol sequence in the input string would satisfy an initial transition for the rule. By examining the initial transition table of the referenced rule, the present invention avoids having to expand all of the rules that may be encapsulated within the referenced rule if the current symbol sequence would never satisfy the rule.

At step 712, each word transition from the current state in the rule for the token is compared against the current symbol sequence in the input string. If the symbol sequence in the input string matches a symbol sequence associated with the transition, a new token is generated that represents the current rule extended to the next state in the rule. This new token is added to the token queue 412.

At step 714, the method determines if there are more tokens in queue 412. If there are more tokens, the process returns to step 704 to select a next token from the queue. Step 706, 708, 710 and 712 are then repeated for the new token. When there are no further tokens in the queue at step 714, the best completed tokens that span the longest portion of the input string are selected at step 718. A parse tree is then formed for each selected token at step 720. Each parse tree is formed by placing the word transitions that matched the input at the leaf nodes of the parse tree and the rules that connect those transitions as nodes within the parse tree. Thus, the rule associated with the selected token forms the root node of the parse tree. After the parse tree has been formed, the method determines if there are more symbol sequences in the input string at step 716. If there are more symbol sequences, the pointer is advanced to the position right after the portion which has been parsed (or the next space delimited symbol sequences if there was no parse) at step 702 and steps 700 through 714 are performed for the new symbol sequence. When there are no more symbols in the input string, the process ends at step 722.

Parse tree 410 is provided to a lattice construction unit 418 in FIG. 4. Lattice construction unit 418 constructs an output lattice 420, which represents the possible text normalizations or inverse text normalizations that can be formed from input text 408. Unlike the prior art, the present invention is able to provide multiple different possible text normalizations and inverse text normalizations for the same input text. Under some embodiments, each possible output path through the output lattice 420 includes a cost that is defined in grammar 400. The cost of the various paths through the output lattice 420 can be used to select a single path through the output lattice.

The default behavior of lattice construction unit 418 is to form the output lattice by traversing the leaves of parse tree 410 in a left to right manner. At each leaf node, a single symbol sequence or a lattice of symbol sequences is constructed. During text normalization, the text between the <out> tags associated with the transition of the leaf node is used to form the output symbol sequence. If there is only one pair of <out> tags for the transitions, a single symbol sequence is formed. However, if there are multiple pairs of <out> tags, a lattice of parallel symbol sequences is formed.

For example, if the transition was defined in the grammar as:

```
<translate>
    <in>1</in>
    <out>one</out>
    <out>one hundred</out>
<translate>
``` lattice construction unit would construct a lattice having one path for "one" and one path for "one hundred" for the leaf node associated with this transition during text normalization.

During inverse text normalization, the text between the <in> tags is used to form the single symbol sequence or the lattice of symbol sequences for the leaf node.

If multiple parse trees were formed for multiple complete rules, lattice construction unit 418 constructs a separate lattice for each parse tree and then combines the lattices in parallel to form the final output lattice 420.

Under one embodiment of the present invention, the default lattice construction performed by lattice construction unit 418 can be overridden using a script that is embedded in text normalization grammar 400. During the parse tree formation, this script is placed in the leaf node. When lattice construction unit 418 encounters a script, it constructs a complete script from all of the leaf nodes of the parse tree and then calls a script interrupter 422 to execute the script. As part of this execution, instructions are provided for modifying the output lattice. These instructions can include incorporating new portions into the lattice, re-organizing the lattice or overwriting parts of the lattice that were previously formed. By allowing this scripting, the present invention allows the grammar author to overcome the ordering limitation of context free transducers, which requires that the order of the input words match the order of the output words.

FIG. 8 provides an example of grammar 400 with an embedded script under one embodiment of the present invention. The grammar of FIG. 8 allows for the inverse text normalization of phrases such as "ten to eleven" into "10:50".

In FIG. 8, the <tag> tags are used to delimit script code. The script code can work with a set of variables to modify the output lattice. In particular, the variable "$.Network[i]" is an array that holds the output lattice. The index, i, to the array indicates the left-to-right position in the lattice. The $.Network[i] variable has a lattice property $.Network[i].latt, which can accept an array for position [i] in the output lattice and a string property $.Network[i].OutStr, which can accept a single string for position [i] in the output lattice.

In addition, the grammar of FIG. 8 provides a shorthand for referring to a variable associated with a rule. In particular, within a rule "$.xyz" can be used to refer to variable "xyz". To access a variable from another rule, the format $rname.xyz is used, where "rname" is the rule name where the xyz variable is set.

In FIG. 8, Number rule 800 provides conversions between the spoken form and the written form of numbers. Within each pair of <out> tags and <in> tags, is a <tag> that includes one scripting instruction. That instruction sets the $.val variable equal to the number in the <in> tag. Note that the $.Val variable is referred to as $Number.Val outside of the Number rule.

Minute rule 804 and Hour rule 810 each reference Number rule 800. Minute rule 804 includes scripting instructions between <tag> tags 805 and 806 and <tag> tags 807 and 808 that assign the value of the $number.val variable to the $.val variable, which is referenced outside of Minute rule 804 as $Minute.val. Hour rule 810 includes similar scripting instructions that assign the $number.val variable to the $.val variable, which is referenced outside of Hour rule 810 as $Hour.val.

Time rule 812 includes references to Minute rule 804 and Hour rule 810 and is triggered by phrases such as "ten to eleven" or "five to two". Time rule 812 also includes <translate> tags 814 and 815, which delimit <tag> tags 816 and 818. <tag> tags 816 and 818 delimit scripting instructions. These instructions include code for performing a function TimeFormat that takes an hour and a minute value and returns a time as "hour:minute". The instructions also assign the value provided by this function to the $.Network[0].outstr property, and thereby set the value in the output lattice.

When the transducer is traversing the context free transducer network, it does not consider information in between the <tag> tags. As such, the information between <translate> tags 814 and 815 is treated as an epsilon transition and does not have to match the input. During parsing, the script found between <tag> tags is stored as a leaf node associated with the rule. Thus, the script between tags 816 and 818 is stored as a leaf node for the node for Time rule 812. Similarly, the instructions between <tag> tags for rules 810 and 804 are stored as leaf nodes for the nodes for those rules.

After the default lattice has been constructed, the script is assembled in a bottom up manner beginning with scripting instructions in the leaf nodes of the lowest nodes of the tree and adding instructions upward until reaching the leaf nodes of the root node of the parse tree. By doing this, any values that must be evaluated by a substructure will be determined in the script before the script reaches script from the root portion of the rule.

Constructing the script in this manner using the grammar of FIG. 8 and the input string "ten to eleven", the script of FIG. 9 would be generated. In FIG. 9, the $number.val variable becomes an array of variables, since the number rule is invoked more than once. As such, in line 900, the variable is referred to as $number[1].val and in line 902, the variable is referred to as $number[2].val. The variable $.network(0).outstring is an array that holds values for the output lattice. The index of the network variable indicates the position in the output lattice that is to receive the value of the "time format" function.

Once the script has been constructed from the parse tree, it is executed by a script interpreter. This script interpreter receives a copy of the default output lattice and creates a new version of the output lattice based on the instructions in the script. This new version of the output lattice is then returned and used to overwrite output lattice 420.

By allowing for scripting in the grammar, the present invention overcomes one of the limitations of a transducer network thereby providing the flexibility found in hard coded text normalization systems while providing the ease of a single grammar that can be used for text normalization and inverse text normalization.

In prior art context free grammars, the grammar is written so that each transition in the context free grammar is associated with a complete word. For morphologically rich languages like French, Spanish and Italian, and agglutinating languages like German and Dutch, this places a great burden on the grammar author because they must include every variation of a word, such as variations for gender, person, number, and case when constructing the grammar. For example, in German, there are multiple forms for the word meter including "meter", "meters", and "metern". In order to provide coverage for all of the prefixes and that can be combined with word meter to form the different metric denominations, the grammar author of the prior art would need to write a transition for every different combination, such as "terameter", "terameters", "terametern", "gigameter", "gigameters", "gigametern", etc.

In one embodiment of the present invention, this burden is removed by allowing the grammar author to write grammar rules for portions of words instead of for the entire word. Thus, one grammar rule can be written for the prefixes of the words and a second grammar rule can be written for the suffixes of the words. A special property value known as "glue" is placed in the <out> tags to indicate that the transition listed in the grammar forms part of a complete transition.

FIG. 10 provides an example of a grammar written with the "glue" property. MetricPrefixesExpanded rule 1000 provides the prefixes for various metric words. MeterExpanded rule 1002 provides complete metric denominations for meters by referencing MetricPrefixExpanded rule 1000 and including a list of transitions, 1004, 1006, and 1008 for the possible variations of meter, which form the suffixes of the words. In transitions 1004, 1006 and 1008, the <out> tag includes a property known as Action, which has a value of "glue-L". This value indicates that the string of characters between the <out> tags forms a portion of a word that is completed by gluing the sequence of characters to the sequence of characters between the <out> tags in MetricPrefixExpanded rule 1000.

When forming the context free transducer network 404, compiler 402 forms a separate transition for each portion of the words and annotates each transition with the "glue" property. During initial formation of the output lattice, lattice construction unit 418 places the output text and the "glue" property in the lattice.

A pass through the lattice is then made to merge transitions that have the "glue" property with their neighboring transitions. For example, if the "glue" property of a transition is "glue-L", the transition is combined with each parallel transition to its immediate left in the output lattice. If the "glue" property of a transition is "glue-R", the transition is combined with each parallel transition to its immediate right in the output lattice.

If there are parallel transitions with the "glue" property, a separate set of transitions is formed for each transition. For example, if there were three parallel transitions with the "glue-L" property and there were four parallel transitions to the left of these transitions in the output lattice, twelve transitions would be formed that would replace these seven transitions. Note that a similar procedure is performed for transitions with the "glue-R" property except that the transitions are merged with transitions to their right in the output lattice.

In other embodiments, the transitions are combined at the time of compiling the context free transducer network 404 instead of modifying the output lattice. Specifically, when forming the context free transducer network 404, compiler 402 forms a transition in the context free transducer network 404 for each possible combination of a transition that includes the "glue" property with the transitions of the rule that the "glue" property is directed to. For example, when compiler 402 encounters line 1004 in FIG. 10, it creates a transition for each transition in MetricPrefixExpanded rule 1000.

For each transition that is created, compiler 402 forms new <in> values for the transition by combining the text in the <in> tags of the transitions of the two rules that were used to form the new transition and forms new <out> values by combining the text in the <out> tags of the transitions of the two rules that were used to form the new transition. For example, the compiler combines the text in the <out> tags of line 1004 with the text in the <out> tags of each transition of MetricPrefixExpanded rule 1000 to form separate values for the <out> tags of each new transition.

In FIG. 10, there are three transitions with the glue property and fourteen transitions in MetricPrefixExpanded rule 1000. As such, compiler 402 would construct forty-two different transitions in the finite state transition network.

Note that for transitions 1010 and 1012 in MetricPrefixExpanded rule 1000, there are two sets of <in> tags. In such a case, a set of <in> tags is formed for each combined transition formed for transitions 1010 and 1012. For example, for one transition formed from transition 1012 there would be two pairs of <in> tags, one for <in>kmeter</in> and one for <in>kilometer</in>. For a second transition, there be <in>kmetern</in> and <in>kilometern</in>.

Thus, compiler 402 uses the glue property to automatically form every combination of prefixes and suffixes, thereby alleviating the burden from the grammar author.

Figure 11:
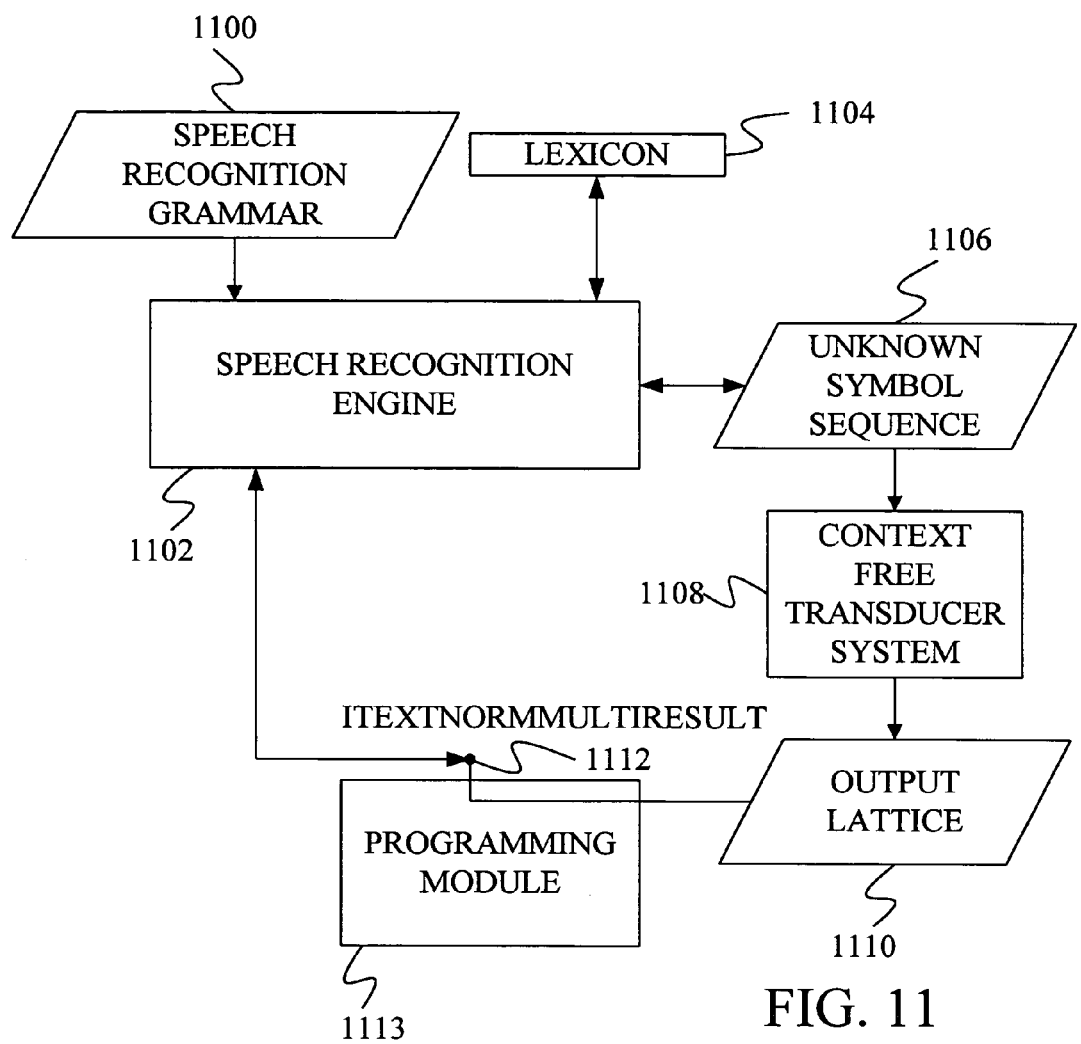
FIG. 11 is a block diagram of a system that utilizes the text normalization technique of the present invention.

The context free transducer system of the present invention may be used to perform text normalization to assist in expanding a speech recognition grammar as shown in FIG. 11.

In FIG. 11, a speech recognition grammar 1100 is authored by the designer of an application. This grammar defines the allowed sequences of words that may be recognized by a speech recognition engine 1102. Upon receiving grammar 1100, speech recognition engine 1102 compiles the grammar using a lexicon 1104 to identify the pronunciation of words in speech recognition grammar 1100. These pronunciations will be used by the speech recognition engine to determine which words have been spoken.

During the compilation process, speech recognition engine 1102 encounters symbol sequences 1106 that are not in lexicon 1104. When this occurs, speech recognition engine 1102 provides symbol sequences 1106 as input text to a context free transducer system such as context free transducer system 422 of FIG. 4. Context free transducer system 1108 produces an output lattice 1110 through a process as described above for FIG. 4.

Under one embodiment of the present invention, speech recognition engine 1102 may access and retrieve the output lattice 1110 through an interface 1112 known as iTextNormMultiResult. This interface represents an interface to programming object or module 1113 and supports a collection of methods that allows speech recognition engine 1102 to obtain specific portions of output lattice 1110 as well as exposing a data structure that contains the entire output lattice. In one particular embodiment, iTextNormMultiResult interface supports the following methods:

GetTopResult: which returns a string containing the highest scoring path through output lattice 1110

GetBestTokens: which returns the highest scoring token found in the parse tree

GetTopResults: which takes as an argument the number, n, of results to be returned and which returns an array of strings representing the top n paths through the output lattice 1110 based on cost IsLinear: which returns a Boolean value to indicate if output lattice 1110 only includes one traversal.

AcceptsTraversal: which takes a string as input and returns a Boolean indicating whether this string was present in output lattice 1110.

GetParseDepth: which returns the number of items parsed from the input text

Serialize: which returns the output lattice 1110 in a serial format.

Deserialize: which receives as input a previous serialized form of the output lattice, and returns an array for the lattice.

The data structure containing the lattice that is exposed by ItextNormMultiResult consists of a value holding the size of the structure, a value holding the number of strings within the structure, an array of the strings starting position indices, and a value containing the strings concatenated together with null separators. The starting position indices indicate the location in the input string where each string in the output string begins.

In further embodiments of the invention, iTextNormMultiResult interface 1112 also supports a number of methods that can be called by the finite state transducer system to perform the parsing of the input text.

Figure 12:
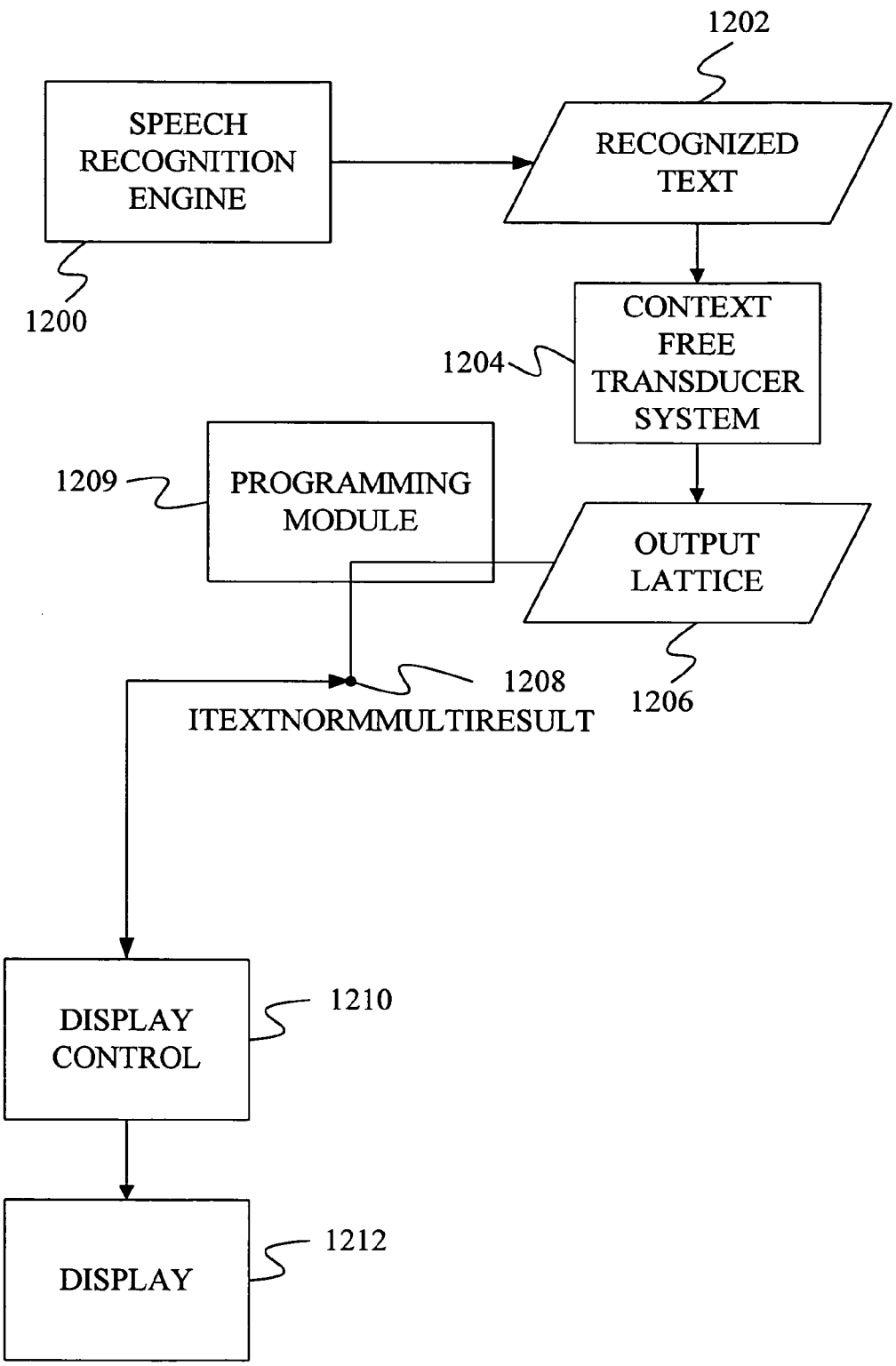
FIG. 12 is a block diagram of a system that utilizes the inverse text normalization technique of the present invention.

The context free transducer system of FIG. 4 may also be used to perform inverse text normalization to convert recognized text into displayable text. FIG. 12 shows a block diagram of a system for converting speech recognition results into displayable text.

In FIG. 12, a speech recognition engine 1200 produces recognized text 1202. This text is passed to context free transducer system 1204 while indicating that the context free transducer system should perform an inverse text normalization on the recognized text. The results of this inverse text normalization is an output lattice 1206, which corresponds to output lattice 420 in FIG. 4. Output lattice 1206 includes the inverse text normalized form of recognized text 1202, including the displayable form such as the numbers "123" for the words "one two three".

Using the iTextNormMultiResult interface 1208 of programming module 1209, a display control 1210 selects one or more of the inverse text normalized results of output lattice 1206 to display on a display 1212. Under one embodiment, display control 1210 retrieves the best scoring inverse text normalized strings to display. In a further embodiment, lower scoring inverse text normalized strings are provided as alternatives to the user when the user highlights the displayed string. This allows the user to correct the displayed string if the best scoring inverse text normalized string is not the string that they desired.

Although the present invention has been described with reference to particular embodiments, workers skilled in the art will recognize that changes may be made in form and detail without departing from the spirit and scope of the invention.

What is claimed is:

1. A method for performing text normalization and inverse text normalization, the method comprising:
    receiving a first string of text symbols;
    using a grammar by a processor to identify a first lattice of output text strings from the first string of text symbols wherein a first path through the first lattice of output text strings represents a second string of text symbols, wherein the grammar comprises a pair of translate tags that define a transition for a transducer network, wherein between the pair of translate tags are multiple pairs of in tags and multiple pairs of out tags, and wherein text symbols between each pair of out tags represent a text normalization for text symbols between each pair of in tags and wherein text symbols between each pair of in tags represent an inverse text normalization for text symbols between each pair of out tags;
    providing the second string of text symbols as the text normalization of the first string of text symbols based on a cost of the first path stored in the grammar;
    receiving the second string of text symbols;
    using the grammar to identify a second lattice of output text strings from the second string of text symbols wherein a second path through the second lattice of output text strings represents the first string of text symbols; and
    providing the first string of text symbols as the inverse text normalization of the second string of text symbols based on a cost of the second path that is stored in the grammar.

2. The method of claim 1 wherein the grammar provides an entry that associates the first string of text symbols with the second string of text symbols.

3. The method of claim 1 wherein using a grammar to identify a first lattice of output text strings comprises forming a context free transducer network from the grammar and using the network to identify the first lattice of output text strings from the first string of text symbols.

4. The method of claim 3 wherein using the grammar to identify the second lattice of output text strings from the second string of text symbols comprises using the context free transducer network to identify the second lattice of output text strings from the second string of text symbols.

5. The method of claim 1 wherein each path through the first lattice of output text strings represents a possible text normalization of the first string of text symbols.

6. The method of claim 5 further comprising:
    receiving a third string of symbols that is represented by a third path through the first lattice of output text strings;
    using the grammar to identify the first string of symbols from the third string of symbols; and
    providing the first string of symbols as the inverse text normalization of the third string of symbols.

7. A computer-readable storage medium having encoded thereon computer-executable instructions that when executed by a processor cause the processor to perform steps comprising:
    performing text normalization using a context free transducer and a grammar, wherein performing text normalization comprises generating a lattice of output textual strings of symbols for a single input textual string of symbols, determining scores for paths through the lattice based on costs stored in the grammar, selecting a path through the lattice based on the scores, and designating the output textual string along the selected path as the text normalization of the input textual string and wherein the grammar comprises a pair of translate tags that define a transition for a transducer network, wherein between the pair of translate tags are multiple pairs of in tags and multiple pairs of out tags, and wherein text symbols between each pair of out tags represent a text normalization for text symbols between each pair of in tags and wherein text symbols between each pair of in tags represent an inverse text normalization for text symbols between each pair of out tags; and performing inverse text normalization using a context free transducer and the grammar.

8. The computer-readable storage medium of claim 7 wherein performing inverse text normalization comprises generating a second lattice of output textual strings of symbols for a second input textual string of symbols.

9. The computer-readable storage medium of claim 7 wherein the grammar comprises a set of rules and wherein at least one rule references another rule in the set of rules.

10. A computer-readable storage medium having encoded thereon computer-executable instructions that when executed by a processor cause the processor to perform steps comprising:

providing an input text and a context free transducer network to a context free transducer, wherein the context free transducer network comprises a network of transitions, each transition having at least one text string representing a spoken form of at least one word and at least one text string representing a display form of the at least one word, wherein the context free transducer network is compiled from a grammar comprising a pair of translate tags that define a transition for the context free transducer network, wherein between the pair of translate tags are multiple pairs of in tags and multiple pairs of out tags, and wherein text symbols between each pair of out tags represent a text normalization for text symbols between each pair of in tags and wherein text symbols between each pair of in tags represent an inverse text normalization for text symbols between each pair of out tags;

instructing the context free transducer to perform text normalization on the input text to produce an output text, wherein the context free transducer produces multiple output text strings representing multiple spoken forms of the input text when performing normalization for the input text;

constructing a lattice from the multiple output text strings;

scoring paths through the lattice using costs stored in a grammar;

selecting a path based on the scores; and outputting the text string that is along the selected path as the spoken form of the input text.

11. The computer-readable storage medium of claim 10 wherein instructing the context free transducer to perform text normalization causes the context free transducer to return the text string representing the spoken form of a transition if at least a portion of the input text matches the text string of the display form of the transition.

12. The computer-readable storage medium of claim 11 wherein instructing the context free transducer to perform inverse text normalization causes the context free transducer to return the text string representing the display form of a transition if at least a portion of the input text matches the text string representing the spoken form of the transition.

13. The computer-readable storage medium of claim 11 wherein the context free transducer produces multiple text strings representing multiple display forms of the at least one word when performing inverse text normalization.

14. The computer-readable storage medium of claim 10 wherein a transition further comprises a property.

15. The computer-readable storage medium of claim 14 wherein the property comprises a name entity property.

* * * * *